US007193012B2

United States Patent
Shibutani (10) Patent No.: US 7,193,012 B2
(45) Date of Patent: Mar. 20, 2007

(54) DISPERSING AGENT COMPRISING VINYL ALCOHOL POLYMER HAVING CONJUGATED DOUBLE BONDS IN ITS MOLECULE

(75) Inventor: Mitsuo Shibutani, Ibaraki (JP)

(73) Assignee: The Nippon Synthetic Chemical Industry Co., Ltd., Osaka-Fu (JP)

( * ) Notice: Subject to any disclaimer, the term of this patent is extended or adjusted under 35 U.S.C. 154(b) by 218 days.

(21) Appl. No.: 10/769,039

(22) Filed: Jan. 30, 2004

(65) Prior Publication Data

US 2004/0186232 A1 Sep. 23, 2004

(30) Foreign Application Priority Data

Jan. 30, 2003 (JP) ............................. 2003-022376

(51) Int. Cl.
- *C08F 2/20* (2006.01)
- *C08F 16/38* (2006.01)
- *C08K 3/20* (2006.01)
- *C08K 5/98* (2006.01)
- *C08K 5/09* (2006.01)
- *C08L 29/04* (2006.01)
- *C08L 29/14* (2006.01)

(52) U.S. Cl. .......................... 525/56; 525/59; 525/60; 526/82; 526/84; 524/394; 524/563; 524/570; 524/579

(58) Field of Classification Search ................ 525/56, 525/59, 60; 526/82, 84
See application file for complete search history.

(56) References Cited

U.S. PATENT DOCUMENTS 6,448,321 B1 * 9/2002 Tokita ........................ 524/394

FOREIGN PATENT DOCUMENTS

| JP | 55-137105 | 10/1980 |
|---|---|---|
| JP | 02-180908 | 7/1990 |
| JP | 03-212409 | 9/1991 |
| JP | 07-018007 | 1/1995 |
| JP | 07-053607 | 2/1995 |
| JP | 07-179507 | 7/1995 |
| JP | 08-269112 | * 10/1996 |
| JP | 08-283313 | 10/1996 |
| JP | 10-001503 | 1/1998 |
| JP | 11-116630 | 4/1999 |
| JP | 2001-122910 | 5/2001 |

OTHER PUBLICATIONS

Translation in part of JP-A-8-283313, published Oct. 29, 1996 Filing No. 7-89904/Filing Date Apr. 17, 1995.
Translation in part of JP-A-8-269112, published Oct. 15, 1996 Filing No. 7-103049/Filing Date Apr. 3, 1995.
"Thermally Modified Poly (Vinyl Alcohol) as a Protective Colloid in Suspension Polymerization of Vinyl Chloride" by M. Fabini Chem. Papers 47 (1) pp. 60-63 (1993).
"The Influence of Poly(vinyl alcohol) Suspending Agents on Suspension Poly(vinyl chloride) Morphology" by S. Ormondroyd British Polymer Journal, vol. 20, No. 4, 1988, pp. 353-359.
"Vinyl Chloride Suspension Polymerisation and the Control of Polymer Properties" by P.V. Smallwood, Makromol. Chem., Macromol. Symp. 29, 1-19 (1989), pp. 1-19.

* cited by examiner

*Primary Examiner*—Duane Smith
*Assistant Examiner*—Ives Wu
(74) *Attorney, Agent, or Firm*—Ware, Fressola, Van Der Sluys & Adolphson LLP (57) ABSTRACT

A dispersing agent suitable for suspension polymerization of vinyl compounds, comprising a polyvinyl alcohol resin containing carbonyl groups in its molecule and having a block character of remaining fatty acid ester groups of at least 0.5 and an absorbance of at least 0.1 measured at each of wavelengths of 215 nm, 280 nm and 320 nm with respect to a 0.1% by weight aqueous solution of the polyvinyl alcohol resin, wherein the ratio of absorbance at 320 nm to absorbance at 280 nm is at least 0.3. The dispersing agent has an excellent surface activity and can suppress foaming which may occur in the suspension polymerization of vinyl compounds.

11 Claims, 2 Drawing Sheets

DISPERSING AGENT COMPRISING VINYL ALCOHOL POLYMER HAVING CONJUGATED DOUBLE BONDS IN ITS MOLECULE

BACKGROUND OF THE INVENTION

The present invention relates to a dispersing agent for suspension polymerization of vinyl compounds, and more particularly to a vinyl alcohol polymer-based dispersing agent comprising a vinyl alcohol polymer which has conjugated double bonds in its molecule and the fatty acid ester units of which are more randomly distributed as compared with conventional vinyl alcohol polymer-based dispersing agents.

Industrial production of vinyl resins has been generally performed by batchwise suspension polymerization wherein a vinyl monomer is dispersed into an aqueous medium in the presence of a dispersing agent in a polymerization vessel and, after adding an oil-soluble polymerization initiator to the vessel, the temperature is elevated to polymerize the monomer. In recent years, in order to shorten the polymerization time required for a batch of polymerization to thereby enhance the productivity, a polymerization vessel equipped with a reflux condenser has been used to accelerate removal of polymerization reaction heat, or a hot water charging polymerization method is proposed wherein a hot aqueous medium is charged to shorten the time for elevating the temperature up to polymerization temperature.

For example, in the production of vinyl chloride resins, however, the use of a polymerization vessel equipped with a reflux condenser has the problem that wet foam and dry foam vigorously generate because the pressure in the vicinity of the reflux condenser lowers by condensation of a vinyl chloride monomer gas. The wet foam is caused by polyvinyl alcohol used as a dispersing agent for the polymerization and is mainly composed of water, and the dry foam is mainly composed of vinyl chloride resin particles. These foams generate mainly in the middle to last stage of polymerization. If wet foam and dry foam generate, a problem arises that the productivity lowers by decrease in effective volume in the polymerization vessel. In case of dry foam, further problem may arise that fouling adheres to the reflux condenser to result in difficulty in control of temperature in the polymerization vessel. If no reflux condenser is used, the polymerization time is of course long, so the productivity is low.

As a countermeasure therefor, it is proposed to add a dispersing agent such as a partially hydrolyzed polyvinyl alcohol to a polymerization system in the stage where the proportion of removal of polymerization reaction heat by the reflux condenser to the overall reaction heat is low (e.g., JP-A-2-180908 and JP-A-3-212409). However, this proposal has the problem that generation of dry foam becomes vigorous, so the bulk density of the produced vinyl chloride resins is easy to be lowered.

Also proposed are methods of polymerization wherein partially hydrolyzed polyvinyl alcohol resins having specific degrees of hydrolysis and specific degrees of polymerization are added before starting the polymerization or when the polymerization conversion falls within a specific range (e.g., JP-A-55-137105, JP-A-7-179507, JP-A-7-53607 and JP-A-7-18007). However, these methods have the defect that the polymerization time is long since no reflux condenser is used and, therefore, the productivity is low.

JP-A-10-1503, JP-A-11-116630 and JP-A-2001-122910 propose methods of polymerization wherein a reflux condenser is used and partially hydrolyzed polyvinyl alcohol resins having specific degrees of hydrolysis and specific degrees of polymerization are added before starting the polymerization or when the polymerization conversion falls within a specific range. Since these methods use a polymerization vessel equipped with a reflux condenser, the productivity is high. However, defoaming effect to suppress dry foam is not sufficient, and these methods still have problems such as fouling buildup. In light of advance in technology, further improvement is desired.

On the other hand, it is reported that vinyl polymers having excellent physical properties are produced by using a polyvinyl alcohol resin having conjugated double bonds in its molecule as a dispersing agent for suspension polymerization of vinyl compounds (e.g., JP-A-8-269112 and JP-A-8-283313). The introduction of conjugated double bonds into polyvinyl alcohol resins is achieved by heat treatment of polyvinyl alcohol resins or carbonyl group-containing polyvinyl alcohol resins whereby fatty acid such as acetic acid is eliminated to produce double bonds. However, in general, conventional methods for the production of polyvinyl alcohol resins having conjugated double bonds require a heat treatment operation at about 150° C. for 5 to 6 hours and accordingly have a problem of increase in production cost. Conventional methods also have the problems that insoluble matter may be produced since there are many occasions of contacting oxygen in production steps and, in addition, the degree of randomness in the sequence distribution of remaining fatty acid ester units such as acetoxy groups does not rise. Further, vinyl polymers obtained by suspension polymerization of vinyl compounds using known dispersing agents comprising polyvinyl alcohol resins having conjugated double bonds in the molecule have a wide particle size distribution. The reason is considered to be that the distribution of conjugated double bonds introduced by conventional methods is not uniform.

JP-A-8-283313 discloses that the polyvinyl alcohol resin having conjugated double bonds in its molecule disclosed therein as a dispersing agent can suppress foaming in suspension polymerization of vinyl compounds. Foaming can be suppressed to some extent, but the proposed dispersing agent has the problem that since the function as a protective colloid is insufficient, coarse particles are produced when hard vinyl chloride resins are produced.

Therefore, a dispersing agent for suspension polymerization which has a satisfactory ability as a surface active agent and can suppress foaming has been demanded.

It is an object of the present invention to provide a polyvinyl alcohol-based dispersing agent which can suppress foaming in suspension polymerization of vinyl compounds.

A further object of the present invention is to economically provide a dispersing agent for suspension polymerization of vinyl compounds.

A still further object of the present invention is to provide a dispersing agent which can provide vinyl polymers having excellent properties and a uniform particle size distribution.

Another object of the present invention is to provide a process for economically preparing a polyvinyl alcohol resin which is useful as a dispersing agent for suspension polymerization of vinyl compounds and provides vinyl polymer particles having excellent properties without generating foaming during the suspension polymerization.

These and other objects of the present invention will become apparent from the description hereinafter.

SUMMARY OF THE INVENTION

It has been found that conjugated double bonds can be uniformly introduced into polyvinyl alcohol resins in a very short time when the heat treatment of carbonyl group-containing polyvinyl alcohol resins is carried out by melt kneading the resins, and the thus obtained polyvinyl alcohol resins have a high surface activity and can exhibit an excellent effect of suppressing foaming, particularly dry foaming, when used as a dispersing agent in suspension polymerization of vinyl compounds such as vinyl chloride.

In accordance with the present invention, there is provided a dispersing agent comprising a polyvinyl alcohol resin containing carbonyl groups in its molecule and having a block character of remaining fatty acid ester groups of at least 0.5 and an absorbance of at least 0.1 measured at each of wavelengths of 215 nm, 280 nm and 320 nm with respect to a 0.1% by weight aqueous solution of the polyvinyl alcohol resin, wherein the ratio of absorbance at 320 nm to absorbance at 280 nm is at least 0.3.

In conventional methods wherein heat treatment to introduce conjugated double bonds is conducted in the solid state, it is difficult to uniformly introduce the conjugated double bonds. In contrast, conjugated double bonds can be very uniformly introduced with ease in the present invention, since a fatty acid elimination reaction takes place in the molten state. As a consequence, the fatty acid ester groups remaining in the PVA resins of the present invention are randomly distributed such that the block character of the remaining fatty acid ester groups is at least 0.5.

It is preferable that each of absorbance values at wavelengths of 215 nm, 280 nm and 320 nm in an ultraviolet absorption spectrum of a 0.1% by weight aqueous solution of the polyvinyl alcohol resin is at least 0.2.

Preferably, the dispersing agent of the present invention contains a salt or hydroxide of a metal having a valence of 1 to 3 which is preferably at least one metal selected from the group consisting of sodium, magnesium, calcium, zinc and aluminum. The metal salts are preferably salts of aliphatic carboxylic acids having 3 or less carbon atoms.

The polyvinyl alcohol resin-based dispersing agent of the present invention is prepared by feeding a polyvinyl alcohol resin to an extruder and melt-extruding it at a resin temperature of 175 to 250° C.

The term "polyvinyl alcohol resin" as used herein encompasses hydrolysis products of not only fatty acid vinyl ester homopolymers, typically polyvinyl acetate, but also copolymers of a fatty acid vinyl ester, typically vinyl acetate, and a small amount, e.g., 0 to 15% by mole, especially 0 to 5% by mole, of other monomers copolymerizable therewith.

The term "block character" [η] as used herein denotes a value obtained from the intensity ratio of peaks based on methylene carbon portions found within the range of 38 to 49 ppm in measurement of $^{13}$C-NMR using 3-(trimethylsilyl)propionic-2,2,3,3-$d_4$acid sodium salt as an internal standard material [chemical shift of (OH, OH) dyad=43.5–46 ppm, chemical shift of (OH, OR) dyad=41–43.5 ppm, and chemical shift of (OR, OR) dyad=38–40.5 ppm], and it is calculated by the following equation (1):

$$[\eta]=(OH, OR)/2(OH)(OR) \quad (1)$$

wherein (OH, OR), (OH) and (OR) are calculated by molar fraction respectively, and (OH) denotes a degree of hydrolysis (molar fraction) calculated from integral ratio in $^{13}$C-NMR. The block character shows a degree of sequence distribution of fatty acid ester units. The larger the value of block character, the lower the blockness in sequence distribution of fatty acid ester groups. In the case that vinyl acetate is used as a fatty acid vinyl ester in the preparation of the polyvinyl alcohol resin, R denotes acetyl group ($CH_3CO$—). The block character and the measuring method thereof are described in detail in POVAL issued by Kobunshi Kankokai in 1984 and Macromolecules, Vol. 10, 532 (1977).

DETAILED DESCRIPTION

The polyvinyl alcohol resin-based dispersing agent of the present invention comprises a polyvinyl alcohol (PVA) resin having carbonyl groups in its molecule, to which conjugated double bonds are introduced. Fatty acid vinyl ester compounds are used as a starting material for the production of the dispersing agent, e.g., vinyl formate, vinyl acetate, vinyl propionate, vinyl butyrate, vinyl caprate, vinyl laurate, vinyl palmitate, vinyl stearate and other saturated linear or branched fatty acid vinyl esters. Vinyl acetate is preferred from a practical point of view and, in general, it is used alone or in combination with fatty acid vinyl ester compounds other than vinyl acetate. The following explanation is made with reference to vinyl acetate, but the present invention is not limited thereto.

The PVA resins having carbonyl groups in the molecule can be prepared by known methods without any restriction, e.g., a method wherein a PVA resin is prepared in a usually manner such as polymerizing vinyl acetate and hydrolyzing the resulting polyvinyl acetate, and is then subjected to an oxidizing treatment with an oxidizing agent such as hydrogen peroxide; a method wherein a carbonyl group-containing PVA resin is prepared in a known manner, for example, by polymerizing vinyl acetate in the presence of a chain transfer agent containing a carbonyl group such as an aldehyde or a ketone, followed by hydrolysis; a method wherein vinyl acetate is polymerized in the presence of 1-methoxyvinyl acetate and the resulting polyvinyl acetate is hydrolyzed; and a method wherein vinyl acetate is polymerized with blowing air into the polymerization system and the resulting polyvinyl acetate is hydrolyzed. From industrial point of view, it is advantageous to prepare carbonyl group-containing PVA resins in such a manner as polymerizing vinyl acetate in the presence of a chain transfer agent such as an aldehyde or a ketone, and hydrolyzing the resulting polyvinyl acetate.

Examples of the chain transfer agent are, for instance, an aldehyde such as acetaldehyde, propionaldehyde, n-butylaldehyde, benzaldehyde, or crotonaldehyde; a ketone such as acetone, methyl ethyl ketone, hexanone, or cyclohexanone; or the like. Of these, acetaldehyde, propionaldehyde, n-butylaldehyde and benzaldehyde are preferred from the viewpoint of easiness in controlling chain transfer of vinyl acetate to a carbonyl compound. The chain transfer agents may be used alone or in admixture thereof.

The amount of the chain transfer agent varies depending on its chain transfer constant or the desired degree of polymerization of PVA resin to be prepared. In general, the amount is preferably from 0.1 to 5% by weight, more preferably from 0.5 to 3% by weight, based on the fatty acid ester such as vinyl acetate. The chain transfer agent may be charged to the polymerization system at one time at a time of starting the polymerization, or may be charged in the course of the polymerization. The molecular weight distribution of PVA resin can be controlled by applying a suitable manner of charging the chain transfer agent.

The method of the polymerization of vinyl acetate is not particularly limited, and any of known polymerization methods can be used. Usually, the polymerization is conducted in a solution polymerization manner using as a solvent an alcohol such as methanol, ethanol or isopropanol. Of course, bulk polymerization, emulsion polymerization and suspension polymerization are applicable. In a solution polymerization, vinyl acetate monomer may be added to the polymerization system at one time, continuously or intermittently. The solution polymerization is conducted in the presence of known radical polymerization initiators such as azobisisobutyronitrile, acetyl peroxide, benzoyl peroxide, lauroyl peroxide, azobisdimethylvaleronitrile or azobismethoxyvaleronitrile. The polymerization temperature is selected from about 40° C. to about the boiling point of the solvent used.

Vinyl acetate may be polymerized alone or may be copolymerized with other monomers copolymerizable therewith, e.g., an unsaturated carboxylic acid or an alkyl ester of the unsaturated carboxylic acid such as acrylic acid, methacrylic acid, crotonic acid, maleic acid or a monoalkyl maleate; a nitrile compound such as acrylonitrile or methacrylonitrile; an amide compound such as acrylamide or methacrylamide; an olefinsulfonic acid or its salt such as ethylenesulfonic acid, allylsulfonic acid or methallylsulfonic acid; a vinyl ether; a vinyl ketone; ethylene; an α-olefin; a vinyl halide: a vinylidene halide; vinyl ethylene carbonate; 3,4-diacetoxy-1-butene; and the like. The other copolymerizable monomers may be used alone or in admixture thereof. The amount of the other copolymerizable monomers is from 0 to 15% by mole, especially 0 to 5% by mole.

The obtained vinyl acetate polymer can be hydrolyzed in a conventional manner. Usually the vinyl acetate polymer is dissolved in a solvent such as an alcohol and is hydrolyzed in the presence of a hydrolysis catalyst such as an alkali or an acid. Examples of the alcohol are, for instance, methanol, ethanol, butanol, isopropanol, and mixed solvents of various alcohols and methyl acetate such as a methanol/methyl acetate mixed solvent. The concentration of the vinyl acetate polymer in the alcohol solution is from 20 to 50% by weight.

The block character can be controlled by conducting an alkali hydrolysis in the presence of solvents having various dielectric constants. In particular, it is preferable to conduct an alkali hydrolysis in a solvent having a dielectric constant of not more than 32. Examples of the solvents having a dielectric constant of not more than 32 are, for instance, methanol (31.2), a mixed solvent of methyl acetate/methanol=1/3 (27.1), a mixed solvent of methyl acetate/methanol=1/1 (21.0), a mixed solvent of methyl acetate/methanol=3/1 (13.9), methyl acetate (7.03), isopropyl acetate (6.3), trichloroethylene (3.42), xylene (2.37), toluene (2.38), benzene (2.28), acetone (21.4), and the like. Methyl acetate/methanol mixed solvents are preferably used.

Examples of the alkali catalyst are, for instance, a hydroxide or alcoholate of an alkali metal such as sodium hydroxide, potassium hydroxide, sodium methylate, sodium ethylate or potassium methylate. Examples of the acid catalyst are, for instance, an inorganic acid such as hydrochloric acid or sulfuric acid, and an organic acid such as p-toluenesulfonic acid. The amount of the alkali catalyst is from 1 to 100 millimolar equivalents, preferably 1 to 40 millimolar equivalents, more preferably 1 to 20 millimolar equivalents, per mole of vinyl acetate. If the amount of the alkali catalyst is less than 1 millimolar equivalent, there is a tendency that it is difficult to increase the degree of hydrolysis up to a desired value. If the amount is more than 100 millimolar equivalents, there is a tendency that the degree of hydrolysis is apt to become higher than a desired value.

The hydrolysis temperature is not particularly limited, but usually selected from 10 to 70° C., preferably from 20 to 50° C.

The hydrolysis may be carried out by continuous operation on a belt or batch operation. In case of batch operation, the hydrolysis is usually carried out for 2 to 3 hours. In case of continuous operation, the hydrolysis is usually carried out for about 15 to about 20 minutes. In that case, hydrolysis catalyst is used in an increased amount.

The degree of hydrolysis of the PVA resins is preferably from 65 to 98% by mole, more preferably from 68 to 85% by mole, the most preferably from 68 to 82% by mole. If the degree of hydrolysis is less than 65% by mole, the water dispersibility of PVA resins is low. If the degree of hydrolysis is more than 98% by mole, the surface activity is low, so the effect of dispersing vinyl monomers becomes worse and, in suspension polymerization of vinyl monomers, vinyl polymers tend to be produced in the form of heavily agglomerated particles.

The average degree of polymerization of the PVA resins is preferably from 200 to 3,000, more preferably from 400 to 1,200. If the average degree of polymerization of less than 200, the function as a protective colloid becomes too low, so agglomeration is easy to occur in suspension polymerization of vinyl monomers such as vinyl chloride. If the average degree of polymerization is more than 3,000, vinyl chloride resins produced by suspension polymerization using the dispersing agent of the present invention have a low plasticizer absorptivity.

Carbonyl group can also be introduced into the PVA resins by cleavage of a part of 1,2-glycol bonds included in the PVA resins when heat-treated in a later stage. The content of 1,2-glycol bonds in the PVA resins is controlled by polymerization temperature for the preparation of the vinyl acetate polymer. It is preferable that the content of 1,2-glycol bonds is from 1.0 to 3.5% by mole.

The carbonyl group-containing PVA resin is then subjected to melt heat treatment, whereby conjugated double bonds are produced in the molecule of the PVA resin by elimination of fatty acid to provide the dispersing agent of the present invention. The content of carbonyl groups in the non-heat-treated PVA resin is preferably at least 0.05% by mole, more preferably at least 0.1% by mole, and is preferably at most 0.5% by mole. If the carbonyl group content is less than 0.05% by mole, there is a tendency that vinylene groups are not produced in a sufficient amount, so the function as a protective colloid required for the dispersing agent is lowered and it is needed to use the dispersing agent in an increased amount.

From the viewpoint that the content of intramolecular carbonyl groups is increased by cleavage of a part of 1,2-glycol bonds present in the PVA resin and from the viewpoint that the elimination of a fatty acid such as acetic acid is accelerated, it is preferable that the PVA resin-based dispersing agent of the present invention contains a salt and/or hydroxide of a metal having a valence of 1 to 3. The phrase "a part of 1,2-glycol bonds present in the PVA resin" denotes about 15% or less of the whole 1,2-glycol bonds.

The monovalent to trivalent metals are preferably aluminum, and alkali and alkaline earth metals such as sodium, magnesium, calcium and zinc. In particular, of these, at least one member selected from the group consisting of sodium, magnesium and calcium, especially magnesium, are preferred from the viewpoint of efficiency in elimination of fatty acid, typically elimination of acetic acid from remaining acetic acid ester groups adjacent to a carbonyl group.

The salts of a metal having a valence of 1 to 3 are preferably salts of aliphatic carboxylic acids having 3 or less carbon atoms, e.g., acetic acid salts and propionic acid salts, from the viewpoint of easiness in handling in practice on an industrial scale such that they are soluble or swellable in water or an alcohol such as methanol.

Typical examples of the metal salt and metal hydroxide are, for instance, aluminum hydroxide, and alkali and alkaline earth metal salts such as sodium acetate, magnesium acetate, calcium acetate, calcium propionate and zinc acetate. Magnesium and calcium compounds are particularly preferable from the viewpoint of the efficiency in fatty acid elimination reaction. Magnesium acetate tetrahydrate and calcium acetate are preferable from the viewpoint that they are soluble in water and/or an alcohol such as methanol and accordingly are easy to handle. These metal compounds may be used alone or in admixture thereof.

The content of the metal salt and/or metal hydroxide in the dispersing agent is preferably from 0.1 to 3% by mole, more preferably from 0.2 to 2% by mole, the most preferably from 0.2 to 1.5% by mole, based on the PVA resin. If the content of the metal salt and/or metal hydroxide is less than 0.1% by mole, the efficiency of the production of conjugated double bonds in the heat treatment tends to lower. If the content is more than 3% by mole, the degree of polymerization of the PVA resins is easy to lower, that is, the PVA resins are easy to be degraded in the heat treatment step.

A manner of adding the metal salt or metal hydroxide to the PVA resins is not particularly limited. The metal salt or metal hydroxide may be directly added to a paste of a vinyl acetate polymer to be subjected to the hydrolysis, a slurry of a hydrolyzed vinyl acetate polymer obtained by the hydrolysis, or a PVA resin powder to be heat-treated in an extruder. Preferably the metal compound is incorporated into the PVA resin in such a manner as dissolving or dispersing the metal compound into water or an alcohol such as methanol, ethanol or propanol in a concentration of 3 to 15% by weight and adding the resulting solution or dispersion to a slurry of the PVA resin obtained in the hydrolysis step.

In the present invention, the carbonyl group-containing PVA resins may be used alone or in the form of a blend of two or more kinds of PVA resins having different properties. The viscosity (degree of polymerization), degree of hydrolysis, molecular weight distribution and the like can be suitably regulated by using a blend of two or more PVA resins and, as a result, it is possible to control the surface activity of the obtained dispersing agent in a very wide range and it is possible to easily provide dispersing agents having desired properties.

In a preferable embodiment, the PVA resin-based dispersing agent is prepared by feeding at least one PVA resin or at least one PVA resin containing a salt or hydroxide of a metal having a valence of 1 to 3 to an extruder and extruding it at a resin temperature of 175 to 250° C., preferably 190 to 220° C. If the temperature is less than 175° C., the efficiency of introducing conjugated double bonds tends to lower, and if the temperature is more than 250° C., the PVA resin is markedly degraded to result in formation of gel and the product tends to be contaminated with a foreign matter such as scorched part. The residence time in the extruder is preferably from 1 to 15 minutes, more preferably from 2 to 10 minutes. If the residence time is less than 1 minute, conjugated double bonds tend to be insufficiently introduced. If the residence time is more than 15 minutes, scorching (degradation of the resin) may occur.

Both a single screw extruder and a twin screw extruder can be used, but the use of a twin screw extruder is preferable. As a twin screw extruder can be used any type of extruders, e.g., corotating twin screw extruder of intermeshing type, counter-rotating twin screw extruder of intermeshing type, twin screw extruder of non-intermeshing type and twin screw extruder of changeover type. Preferably the molten material is extruded in the form of a strand and pelletized. Cooling of strands extruded from an extruder can be made in an arbitrary manner, e.g., a manner of air cooling with transferring the strands on a belt and a manner of forcibly blowing a cold air to the strands by a spot cooler with transferring the strands on a belt. As a pelletizer is preferred a pelletizer for soft polyolefins from the viewpoint that minipellets are efficiently obtained. The shape of a die of the extruder is not particularly limited, but it is preferable that the number of holes through which strands are discharged are from 20 to 50. The size of pellets is from 0.2 to 4 mm in thickness and from 0.2 to 4 mm in length, preferably from 0.5 to 2 mm in thickness and from 0.5 to 2 mm in length. The combination of kneading blocks of the screw and the number of kneading blocks are suitably selected according to desired residence time and resin temperature.

Conjugated double bonds are produced by elimination reaction of fatty acid from fatty acid ester groups remaining in a PVA resin by melt heat treatment of the PVA resin using an extruder, whereby the degree of randomness in distribution of the fatty acid vinyl ester units in the PVA resin is enhanced, so the thus treated PVA resin exhibits an excellent effect of suppressing foaming. In a conventional method, contact with oxygen is unavoidable in a heat treatment step and accordingly an insoluble matter may be produced, but such a problem has also been solved since the heat treatment is conducted in an extruder.

The thus prepared PVA resins, which may further contain a metal salt or hydroxide as mentioned above, are useful as a primary dispersing agent for suspension polymerization of vinyl compounds.

In an ultraviolet absorption spectrum of a 0.1% by weight aqueous solution of the PVA resin used as a dispersing agent of the present invention, each of the absorbances at wavelengths of 215 nm, 280 nm and 320 nm is at least 0.1, preferably at least 0.2, more preferably at least 0.25. The absorption at 215 nm in the ultraviolet absorption spectrum is assigned to —CO—CH=CH— structure in the PVA resin, the absorption at 280 nm is assigned to —CO—(CH=CH)$_2$— structure in the PVA resin, and the absorption at 320 nm is assigned to —CO—(CH=CH)$_3$— structure in the PVA resin. As the content of the conjugated double bonds in the PVA resin increases, the absorbance increases and the surface activity of the PVA resin, e.g., function as a protective colloid, increases. If each of the absorbances is less than 0.1, the PVA resin does not exhibit a sufficient effect of stabilizing suspension polymerization of vinyl compounds and a problem arises that the particle size distribution of the obtained vinyl polymers becomes wide or coarse particles are produced. The PVA resins of the present invention prepared by heat treatment of carbonyl group-containing PVA resins in the molten state have a ratio of absorbance at 320 nm ($A_{320}$) to absorbance at 280 nm ($A_{280}$) of at least 0.3. Preferably, the $A_{320}/A_{280}$ ratio is from 0.45 to 1.5, especially from 0.5 to 1.2, more especially 0.6 to 1.2, further more especially 0.9 to 1.2. If the $A_{320}/A_{280}$ ratio is less than 0.3, the emulsifying ability is lowered. If the $A_{320}/A_{280}$ ratio is too high, foaming may occur in suspension polymerization of vinyl compounds.

The block character of fatty acid ester groups remaining in the PVA resin used as the dispersing agent is at least 0.5, preferably at least 0.55. If the block character is less than 0.5, the foaming suppression effect required in suspension polymerization of vinyl compounds such as vinyl chloride is lowered.

A method of the suspension polymerization of vinyl compounds, typically vinyl chloride, using the dispersing agent of the present invention will be explained below.

Any of methods used in usual suspension polymerization of vinyl chloride-containing monomer material are applicable to the suspension polymerization using the dispersing agent of the present invention.

In the suspension polymerization, the PVA resin (dispersing agent) may be added to the polymerization system in the form of a powder or an aqueous solution, and may be added all at once in the initial stage of the polymerization or may be divided into parts and intermittently added during the polymerization. Also, the PVA resin may also be added in the form of an aqueous dispersion when it has a low degree of hydrolysis (less than about 67% by mole and forms an aqueous dispersion. In particular, in the case that the PVA resin is soluble in water, it is added in the form of an aqueous solution. Even in the case that the PVA resin is not soluble water, it may be dissolved in an organic solvent such as an alcohol, a ketone or an ester or a mixed solvent of water and an organic solvent and be added in the form of a solution. If a PVA resin has a low degree of hydrolysis of less than 67% by mole, but it has a self-dispersibility into water by modification with carboxylic acid or the like, an aqueous dispersion of the PVA resin can be added to the polymerization system.

The amount of the PVA resin (dispersing agent) is not particularly limited, but usually it is preferable to use it in an amount of at most 5 parts by weight, especially 0.01 to 1 part by weight, more especially 0.02 to 0.2 part by weight, per 100 parts by weight of a vinyl chloride-containing monomer.

In the suspension polymerization, the dispersing agent of the present invention may be used in combination with various known secondary dispersing agents. As a secondary dispersing agent is preferably used a partially hydrolyzed polyvinyl alcohol having a degree of hydrolysis of less than 65% by mole and a degree of polymerization of 100 to 750, especially a partially hydrolyzed polyvinyl alcohol having a degree of hydrolysis of 30 to 60% by mole and a degree of polymerization of 180 to 650. The secondary dispersing agents may be those having a water-solubility or water-dispersibility and having a self-emulsifying property provided by introduction of ionic groups derived from a carboxylic acid, a sulfonic acid or the like, e.g., Gohsefymer LL-02, Gohsefymer L-5407, Gohsefymer L-7514, Gohsefymer LW100, Gohsefymer LW200, Gohsefymer LW300 and Gohsefymer LS210 which are products of The Nippon Synthetic Chemical Industry Co., Ltd., LM-20, LM-25 and LM-10HD which are products of Kuraray Co., Ltd., Alcotex 55-002H, Alcotex 55-002P, Alcotex WD100 and Alcotex WD200 which are products of Synthomer Ltd., Sigma 404W and Sigma 202 which are products of Sigma, and the like.

The ratio of the PVA resin-based dispersing agent of the present invention to the secondary dispersing agent varies depending on the kinds thereof, but in general, it is preferably from 90/10 to 30/70 by weight, more preferably from 80/20 to 50/50 by weight.

By combination use of the dispersing agent with a secondary dispersing agent, formation of a thick skin layer in the surface of the produced vinyl chloride resin particles can be prevented and, in addition, primary particles having a size on the order of 1 to several micrometers which constitute each of particles produced by suspension polymerization can be prevented from agglomerating in a grain, whereby the physical properties of the obtained vinyl chloride resins such as porosity distribution, plasticizer absorptivity and monomer removability are further improved.

Any of known oil-soluble catalysts can be used as a suspension polymerization catalyst. Examples of the oil-soluble polymerization catalyst are, for instance, benzoyl peroxide, lauroyl peroxide, diisopropyl peroxydicarbonate, α,α'-azobisisobutyronitrile, α,α'-azobis-2,4-dimethylvaleronitrile, acetylcyclohexylsulfonyl peroxide, and other catalysts conventionally used in suspension polymerization of vinyl compounds. The catalysts may be used alone or in admixture thereof.

The PVA resin-based dispersing agent of the present invention can be used in combination with other known dispersing agents, i.e., high molecular weight compounds conventionally used as a primary dispersing agent for suspension polymerization of vinyl compounds. Examples of the other dispersing agents are, for instance, PVA resins other than the PVA resin according to the present invention, e.g., a PVA having an average degree of polymerization of 100 to 4,000 and a degree of hydrolysis of 0 to 95% by mole and its derivatives such as formalized PVA, acetalized PVA, butyralized PVA, urethanated PVA and esterified PVA with sulfonic acid or carboxylic acid, and a hydrolyzed copolymer of a vinyl ester and other monomer copolymerizable therewith wherein the other copolymerizable monomer includes, for instance, an olefin such as ethylene, propylene, isobutylene, α-octene, α-dodecene or α-octadecene, an unsaturated acid, its salt and its mono- or dialkyl ester such as acrylic acid, methacrylic acid, crotonic acid, maleic acid, maleic anhydride or itaconic acid, a nitrile compound such as acrylonitrile or methacrylonitrile, an amide such as acrylamide or methacrylamide, an olefin sulfonic acid or its salts such as ethylene sulfonic acid, allyl sulfonic acid or methallyl sulfonic acid, an alkyl vinyl ether, a vinyl ketone, N-vinylpyrrolidone, vinyl chloride, vinylidene chloride, and the like. Examples of other high molecular weight compounds known as a dispersing agent are, for instance, cellulose derivatives such as methyl cellulose, ethyl cellulose, hydroxymethyl cellulose, hydroxypropylmethyl cellulose, hydroxybutylmethyl cellulose, hydroxyethyl cellulose, carboxymethyl cellulose, aminomethylhydroxypropyl cellulose and aminoethylhydroxypropyl cellulose, starch, traganth, pectin, glue, alginic acid or its salts, gelatin, polyvinylpyrrolidone, polyacrylic acid or its salts, polymethacrylic acid or its salts, polyacrylamide, polymethacrylamide, copolymers of vinyl acetate and an unsaturated acid such as maleic acid, maleic anhydride, acrylic acid, methacrylic acid, itaconic acid, fumaric acid or crotonic acid, copolymers of styrene and the unsaturated acid mentioned above, copolymers of a vinyl ether and the unsaturated acid mentioned above, salts or esters of these copolymers mentioned above, and the like.

Various surface active agents and inorganic dispersing agents may be optionally used as a secondary dispersing agent in the suspension polymerization. Further, in the case that the degree of hydrolysis is less than 70% by mole, it is also possible to use the PVA resins of the present invention as a secondary dispersing agent for suspension polymerization of vinyl compounds.

In the suspension polymerization, chain transfer agents conventionally used in usual suspension polymerization of vinyl chloride-containing monomer materials may be used, e.g., mercaptoethanol or carbon tetrachloride.

The temperature of an aqueous medium used in the suspension polymerization for the preparation of vinyl chloride resins is not particularly limited, and it is possible to use hot water of about 97° C., not to mention ordinary temperature water of about 20° C. In order to shorten the temperature elevation time in the polymerization, it is preferable to conduct the polymerization in a hot water charging manner wherein a hot water previously heated to 40 to 97° C., especially to a temperature within the range between 40° C. and about polymerization starting temperature (e.g., 50 to 65° C.), is added to a polymerization reactor.

The suspension polymerization temperature is suitably selected from known ranges according to desired degree of polymerization of vinyl polymers to be produced and the like. In general, the polymerization temperature is preferably from 30 to 80° C. The monomer/water ratio is usually from 0.5 to 1.2 by weight. Water may be added to the polymerization system during the polymerization to supplement drop of the liquid surface owing to volume shrinkage accompanying the polymerization, and it is rather preferable since formation of fish eyes can be suppressed.

The suspension polymerization pressure is also suitably selected from known ranges according to polymerization temperature, desired degree of polymerization of vinyl polymers to be produced and the like.

The agitation in the suspension polymerization is not needed to be special, and known agitators conventionally used in suspension polymerization of vinyl chloride-containing monomer materials can be used. The agitating blade may be those popularly used, e.g., Pfaudler blade, paddle blade, turbine, fan turbine and Brumagin blade. Pfaudler-type impeller is preferred. The agitators may be combined with baffles of various types such as plate type, cylinder type, D-type, loop type and finger type.

In the suspension polymerization of vinyl chloride-containing monomer materials, vinyl chloride may be homopolymerized or may be copolymerized with other monomers copolymerizable therewith, e.g., a vinylidene halide, a vinyl ether, vinyl acetate, vinyl benzoate, acrylic acid and its esters, methacrylic acid and its esters, maleic acid, maleic anhydride, ethylene, propylene, styrene, and the like.

In the suspension polymerization, known additives conventionally used in polymerization of vinyl chloride may be optionally used, e.g., polymerization regulator, gelation modifier, antistatic agent, pH regulator and the like.

Foaming which occurs in suspension polymerization of vinyl chloride, can be suppressed by using the dispersing agent of the present invention and, moreover, vinyl chloride resins having excellent properties can be prepared without the quality performances thereof such as particle size, particle size distribution and plasticizer absorptivity being affected by the temperature of a hot water charged during the suspension polymerization.

Suspension polymerization using the dispersing agent of the present invention has been explained mainly with reference to polymerization of vinyl chloride-containing monomer materials, but the dispersing agent of the present invention is also applicable to suspension polymerization of other vinyl compounds such as styrene, acrylates, methacrylates, vinyl acetate and the like.

The present invention is more specifically described and explained by means of the following Examples, but it is to be understood that the present invention is not limited thereto.

EXAMPLE 1

[Preparation of Polyvinyl Alcohol Resin-Based Dispersing Agent]

A polymerization reactor was charged with 100 parts by weight of vinyl acetate, 1.2 parts by weight of acetaldehyde, 4.7 parts by weight of methanol and 0.0092% by weight of, based on vinyl acetate, acetyl peroxide (APO). After replacement with nitrogen gas, the reactor was heated, and the polymerization was started at boiling temperature and terminated about 5.7 hours later when the polymerization conversion reached 91.8% by weight. Unreacted vinyl acetate was then removed, and to the obtained reaction mixture (40% by weight methanol solution of polyvinyl acetate) was added a methanol solution of 4.7 millimoles of sodium hydroxide per mole of vinyl acetate unit. The hydrolysis was carried out at 35° C. for 2 hours in a usual manner to give a slurry (resin concentration 12% by weight) of a PVA resin (degree of polymerization 770, degree of hydrolysis 71.7% by mole, content of carbonyl group 0.16% by mole).

To the thus prepared PVA resin was then added 350 g of magnesium acetate tetrahydrate per kg of the PVA resin in the form of a 10% by weight methanol solution. After stirring the mixture at 25° C. for 1 hour, it was filtered by a Nutsche and dried to give the PVA resin containing 1.25% by mole of magnesium acetate. The obtained PVA resin was fed to a twin screw extruder and heat-treated therein under the following extrusion condition A to give a polyvinyl alcohol resin-based dispersing agent.

The degree of hydrolysis, degree of polymerization and carbonyl group content of the PVA resin prior to the heat treatment, and the degree of hydrolysis and degree of polymerization of the PVA resin after the heat treatment are shown in Table 2.

The absorbance and block character of the polyvinyl alcohol resin-based dispersing agent are shown in Table 3.

Figure 1:
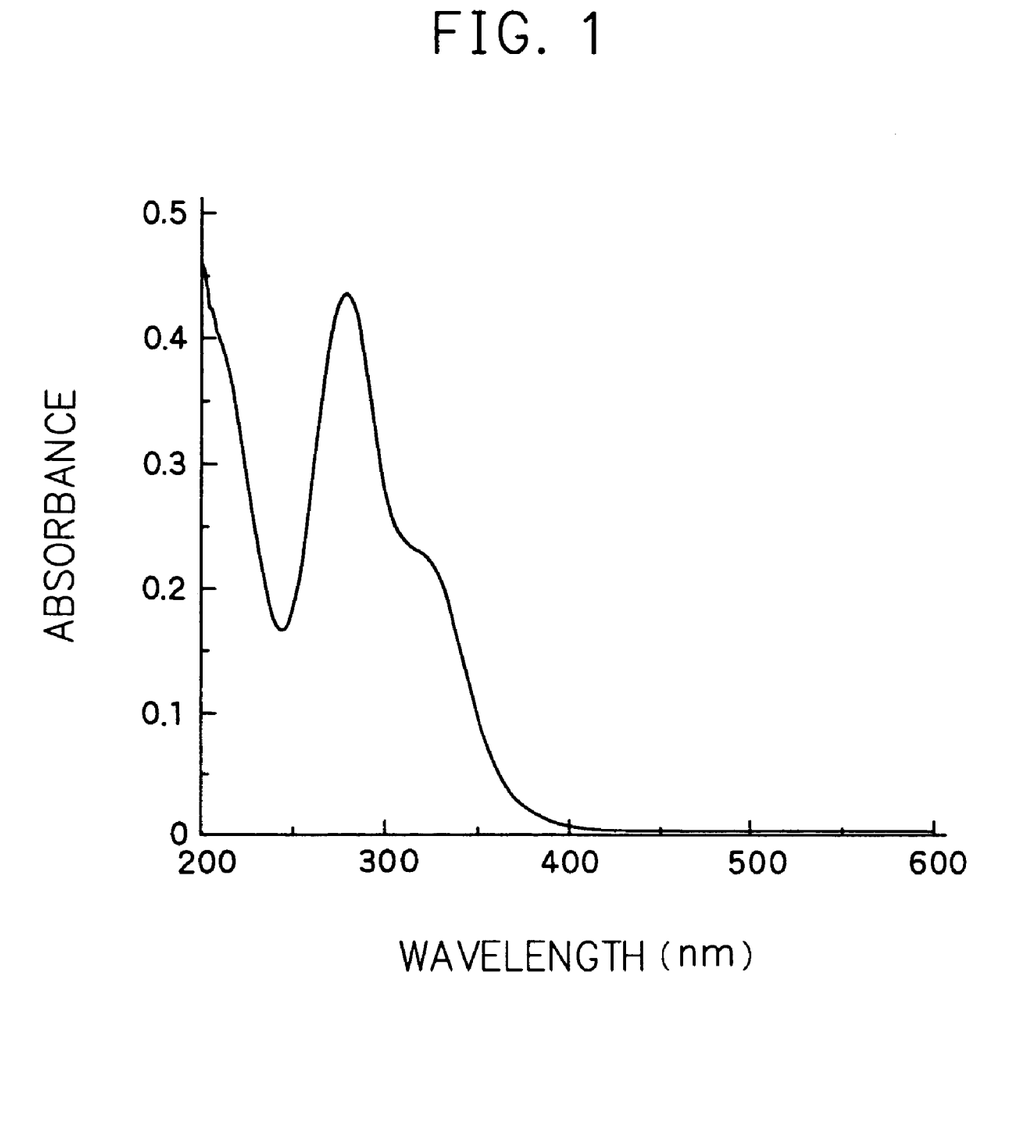
FIG. 1 is an ultraviolet absorption spectrum of a 0.1% by weight aqueous solution of a polyvinyl alcohol resin-based dispersing agent prepared in Example 1 described after.

Further, the result of measurement of the absorbance of the polyvinyl alcohol resin-based dispersing agent is shown in FIG. 1.

The extrusion conditions and the methods of measurement are shown below.

Extrusion Conditions

The extrusion heat treatment of PVA resin was conducted at the following resin temperature under the following extrusion conditions using a twin screw extruder (model KZW15 made by Technobel Kabushiki Kaisha, L/D=60, φ=15, full flight, rotation in the same direction).

(Extrusion Condition A)

Temperature setting: C1/C2/C3/C4/C5/C6/C7/C8/D3=90/150/185/185/190/195/195/195/195° C.

Number of revolutions of screw: 200 r.p.m.

Number of revolutions of feed: 50 r.p.m.

Resin temperature: 195° C.

C8 part: vent (Extrusion Condition B)
Temperature setting: C1/C2/C3/C4/C5/C6/C7/C8/D3=100/190/200/200/200/200/200/200/200° C.
Number of revolutions of screw: 200 r.p.m.
Number of revolutions of feed: 50 r.p.m.
Resin temperature: 200° C.
C8 part: vent (Extrusion Condition C)
Temperature setting: C1/C2/C3/C4/C5/C6/C7/C8/D3=100/195/205/205/205/205/205/205/205° C.
Number of revolutions of screw: 200 r.p.m.
Number of revolutions of feed: 50 r.p.m.
Resin temperature: 205° C.
C8 part: vent (Extrusion Condition D)
Temperature setting: C1/C2/C3/C4/C5/C6/C7/C8/D3=100/195/210/210/210/210/210/210/210° C.
Number of revolutions of screw: 200 r.p.m.
Number of revolutions of feed: 50 r.p.m.
Resin temperature: 210° C.
C8 part: vent (Pelletizer)
Pelletizer for soft olefin resins: Model TSS-100 made by Kabushiki Kaisha Tanaka
Size of pellets: mini-pellets of 1 to 2 mm in thickness and 1 to 2 mm in length Degree of Polymerization
Measured according to JIS K 6726

Block Character [η]
$^{13}$C-NMR spectrum was measured using 3-(trimethylsilyl)propionic-2,2,3,3-$d_4$acid sodium salt as an internal standard material. The block character is obtained from the intensity ratio of peaks based on methylene carbon portions found within the range of 38 to 49 ppm [chemical shift of (OH, OH) dyad=43.5–46 ppm, chemical shift of (OH, OR) dyad=41–43.5 ppm, and chemical shift of (OR, OR) dyad=38–40.5 ppm] according to the following equation:

$$[\eta]=(OH, OR)/2(OH)(OR)$$

wherein (OH, OR), (OH) and (OR) are calculated by molar fraction respectively, R is acetyl group ($CH_3CO$—) in the Examples, and (OH) denotes a degree of hydrolysis (molar fraction) calculated from integral ratio in $^{13}$C-NMR and (OR) denotes the molar fraction of acetoxy group at that time.

Absorbance
Absorbance of a 0.1% by weight aqueous solution of a polyvinyl alcohol resin-based dispersing agent was measured at wavelengths of 215 nm, 280 nm and 320 nm by an ultraviolet-visible ray-near infrared spectrophotometer (model V-560 made by Nippon Bunkoh Kabushiki Kaisha) using a cell having a thickness of 1 cm.

Solubility
An Erlenmeyer flask was charged with 5.0 g of a PVA resin and 120 g of deionized water. The resulting mixture was stirred at room temperature for 30 minutes and at 80° C. for 1 hour, and then cooled to 20° C. and filtered with suction with a filter paper for chemical analysis having a known weight (A g). The flask was washed with 50 g of water and the wash water was filtered with suction. The washing-filtering procedure was repeated 3 times in total. Further, 3 liters of deionized water was passed through the filter paper with suction. The filter paper was dried at 105° C. for 3 hours and weighed (B g). The solubility of the PVA resin was calculated according to the following equation and evaluated according to the following criteria.

$$\text{Solubility }(\%)=100-[(B-A)/5.0\times100]$$

○: Solubility is not less than 99.995%.
X: Solubility is less than 99.995%.

[Suspension Polymerization of Vinyl Chloride]
A 2,000 liter autoclave equipped with a reflux condenser was charged with 450 g of the polyvinyl alcohol resin-based dispersing agent prepared above, 260 g of di-2-ethylhexyl peroxydicarbonate, 900 kg of deionized water and 600 kg of vinyl chloride. The mixture was heated to 57° C. with stirring by passing a hot water into a jacket to start the polymerization. The pressure in the autoclave at the time of starting the polymerization was 7.0 kg/cm$^2$G. Unreacted monomer was recovered when the inner pressure had dropped to 6.0 kg/cm$^2$G, and the obtained slurry of a polymer was taken out of the autoclave, dehydrated and dried to give polyvinyl chloride.

The following evaluations were made with respect to the state of generation of dry foam in the autoclave and the obtained polyvinyl chloride.

Generation of Dry Foam (State of Fouling Buildup)
The state of generation of dry foam was evaluated by observing the state of fouling buildup onto the reflux condenser according to the following criteria.
○: No fouling buildup is observed.
Δ: Slight fouling buildup is observed.
X: Noticeable fouling buildup is observed.

Amount of Foamy Polymer Particles
Ten kilograms of polyvinyl chloride was sieved with a 48 mesh sieve provided in JIS Z 8801, and the amount of particles on the sieve was measured and the proportion thereof was calculated.

Bulk Density of Polyvinyl Chloride
Measured according to JIS K 6721.

Fish Eye
The following evaluations A and B were made.

(Evaluation A Using Trimellitic Acid Ester)
A mixture of 100 parts by weight of the obtained polyvinyl chloride particles, 50 parts by weight of tris(2-ethylhexyl)trimellitate and 3 parts by weight of a powdery lead stabilizer was kneaded by a roll mill at 155° C. for 5 minutes and formed into a 0.3 mm thick sheet. The number of fish eyes per 25 cm$^2$ was counted after 3 minutes, 4 minutes, 5 minutes and 7 minutes.

(Evaluation B Using DOP)
The evaluation was made in the same manner as above using a mixture of 100 parts by weight of the obtained polyvinyl chloride particles, 50 parts by weight of DOP (dioctyl phthalate), 3 parts by weight of dioctyl tin dilaurate and 1 part by weight of zinc.

EXAMPLES 2 to 14

Polyvinyl alcohol resin-based dispersing stabilizers having the characteristics shown in Table 3 were prepared by conducting the polymerization, hydrolysis and extrusion heat treatment in the same manner as in Example 1 except that the amounts of acetaldehyde, methanol and APO used in the polymerization were changed as shown in Table 1 and the heat treatment of PVA resins having the properties shown in Table 2 was carried out under the conditions shown in Table 2. The dispersing stabilizers were evaluated in the same manner as in Example 1.

In Examples 13 and 14, the procedure of Example 2 was repeated except that the heat treatment was conducted at the temperature shown in Table 2.

The results are shown in Tables 3 and 4.

Figure 2:
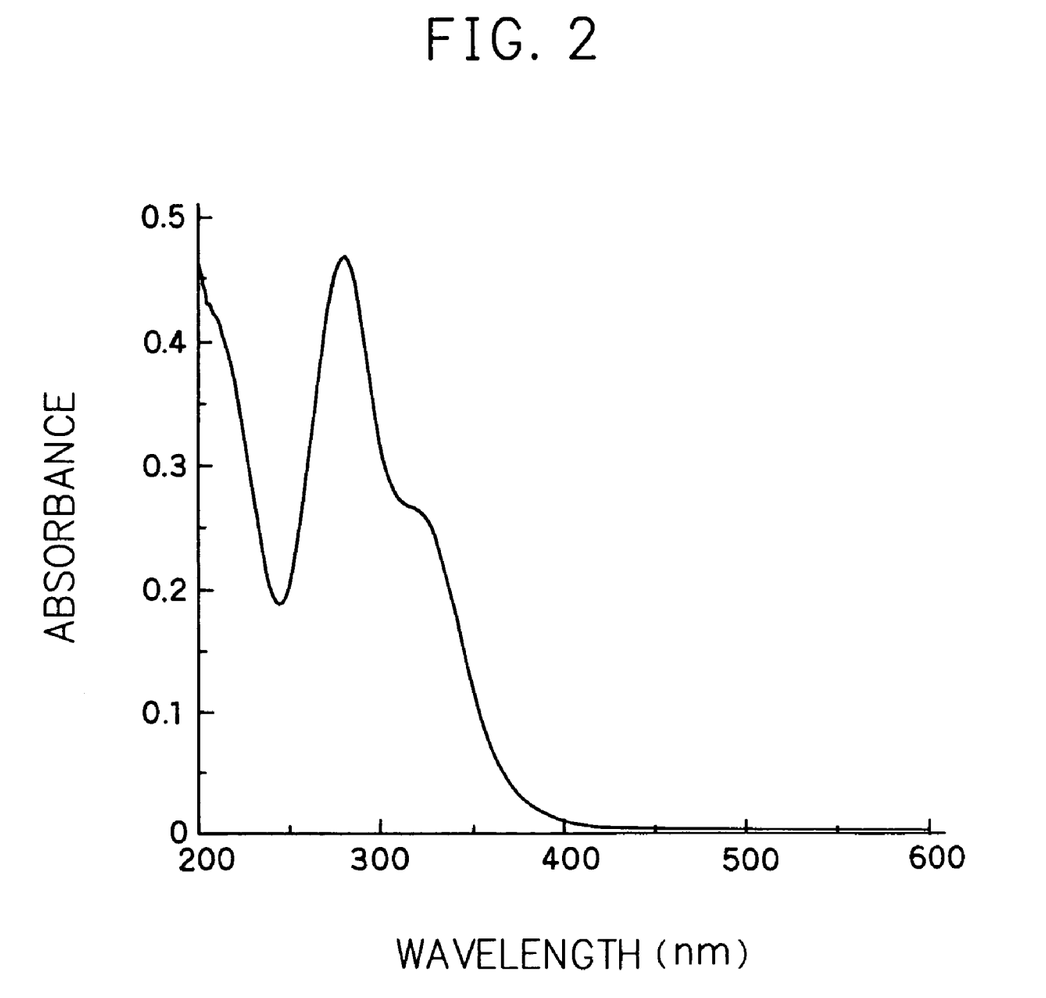
FIG. 2 is an ultraviolet absorption spectrum of a 0.1% by weight aqueous solution of a polyvinyl alcohol resin-based dispersing agent prepared in Example 2 described after.

The result of measurement of the absorbance of the polyvinyl alcohol resin-based dispersing agent obtained in Example 2 is also shown in FIG. 2.

Comparative Example 1

The procedure of Example 1 was repeated except that the PVA resin was heat-treated in the form of a powder in a tank at 150° C. for 5 hours. The results are shown in Tables 3 and 4.

TABLE 1

| | Polymerization of vinyl acetate | | | | |
|---|---|---|---|---|---|
| | Vinyl acetate (part by weight) | Acetaldehyde (part by weight) | Methanol (part by weight) | APO (% by weight) | Polymerization conversion (% by weight) |
| Example 1 | 100 | 1.2 | 4.7 | 0.0092 | 91.8 |
| Example 2 | 100 | 1.0 | 40 | 0.04 | 90.3 |
| Example 3 | 100 | 1.0 | 50 | 0.05 | 91.4 |
| Example 4 | 100 | 1.0 | 50 | 0.06 | 95.0 |
| Example 5 | 100 | 1.2 | 60 | 0.07 | 95.0 |
| Example 6 | 100 | 1.0 | 50 | 0.06 | 95.0 |
| Example 7 | 100 | 1.0 | 50 | 0.06 | 95.0 |
| Example 8 | 100 | 0.8 | 50 | 0.05 | 90.0 |
| Example 9 | 100 | 1.2 | 4.7 | 0.0092 | 91.8 |
| Example 10 | 100 | 1.2 | 4.7 | 0.0092 | 91.8 |
| Example 11 | 100 | 1.2 | 4.7 | 0.0092 | 91.8 |
| Example 12 | 100 | 0.6 | 30 | 0.03 | 20.0 |

TABLE 3

| | Absorbance of dispersing agent | | | | |
|---|---|---|---|---|---|
| | 215 nm | 280 nm | 320 nm | $A_{320}/A_{280}$ ratio | Block character $\eta$ |
| Ex. 1 | 0.371 | 0.435 | 0.226 | 0.52 | 0.55 |
| Ex. 2 | 0.398 | 0.466 | 0.261 | 0.56 | 0.59 |
| Ex. 3 | 0.401 | 0.464 | 0.280 | 0.60 | 0.57 |
| Ex. 4 | 0.380 | 0.430 | 0.246 | 0.57 | 0.56 |
| Ex. 5 | 0.381 | 0.445 | 0.248 | 0.56 | 0.56 |
| Ex. 6 | 0.340 | 0.398 | 0.200 | 0.50 | 0.54 |
| Ex. 7 | 0.300 | 0.328 | 0.170 | 0.52 | 0.53 |
| Ex. 8 | 0.367 | 0.331 | 0.236 | 0.71 | 0.62 |
| Ex. 9 | 0.420 | 0.457 | 0.265 | 0.58 | 0.58 |
| Ex. 10 | 0.448 | 0.484 | 0.300 | 0.62 | 0.62 |
| Ex. 11 | 0.469 | 0.505 | 0.341 | 0.68 | 0.59 |
| Ex. 12 | 0.380 | 0.420 | 0.210 | 0.50 | 0.55 |
| Ex. 13 | 0.354 | 0.344 | 0.325 | 0.94 | 0.57 |
| Ex. 14 | 0.529 | 0.490 | 0.537 | 1.14 | 0.60 |
| Com. Ex. 1 | 0.598 | 0.572 | 0.505 | 0.88 | 0.47 |

TABLE 2

| | Degree of hydrolysis (% by mole) | Degree of polymerization | Content of carbonyl group (% by mole) | Metal compound | | Resin temperature in extrusion (° C.) |
|---|---|---|---|---|---|---|
| | | | | Kind | Content (% by mole) | |
| Ex. 1 | 71/71.5 | 770/720 | 0.16 | Magnesium acetate | 1.25 | 195 |
| Ex. 2 | 72/72.8 | 800/752 | 0.13 | Magnesium acetate | 0.75 | 195 |
| Ex. 3 | 72/72.6 | 730/725 | 0.16 | Magnesium acetate | 0.35 | 195 |
| Ex. 4 | 71.5/71.7 | 700/638 | 0.17 | Magnesium acetate | 0.2 | 195 |
| Ex. 5 | 71.5/72 | 655/600 | 0.19 | Magnesium acetate | 2.5 | 195 |
| Ex. 6 | 71.5/71.7 | 700/630 | 0.17 | Calcium acetate | 1 | 195 |
| Ex. 7 | 71.5/71.9 | 700/673 | 0.17 | Calcium propionate | 0.15 | 195 |
| Ex. 8 | 75.0/75.5 | 800/754 | 0.13 | Sodium acetate | 1.4 | 195 |
| Ex. 9 | 71/71.5 | 770/720 | 0.16 | Sodium acetate | 1.25 | 200 |
| Ex. 10 | 71/71.5 | 770/720 | 0.16 | Magnesium acetate | 1.25 | 205 |
| Ex. 11 | 71/71.5 | 770/720 | 0.16 | Magnesium acetate | 1.25 | 210 |
| Ex. 12 | 80/81.6 | 1100/1020 | 0.08 | Magnesium acetate | 0.75 | 195 |
| Ex. 13 | 72.0/73.0 | 800/732 | 0.13 | Magnesium acetate | 0.75 | 210 |
| Ex. 14 | 72.0/73.2 | 800/728 | 0.13 | Magnesium acetate | 0.75 | 215 |
| Com. Ex. 1 | 71.1/72 | 770/730 | 0.16 | Magnesium acetate | 0.75 | — |

Note)
"Degree of hydrolysis" and "Degree of polymerization" denote (value before heat treatment)/(value after heat treatment), and "Content of carbonyl group" denotes a value before heat treatment.

TABLE 4

|  | State of fouling Solubility | State of fouling buildup | Amount of foamy polymer (% by weight) | Bulk density | Fish eye Evaluation A 3 min. | Fish eye Evaluation A 5 min. | Fish eye Evaluation A 7 min. | Fish eye Evaluation B 3 min. | Fish eye Evaluation B 5 min. | Fish eye Evaluation B 7 min. |
|---|---|---|---|---|---|---|---|---|---|---|
| Ex. 1 | ○ | ○ | 0.02 | 0.52 | 100 | 11 | 0 | 50 | 3 | 0 |
| Ex. 2 | ○ | ○ | 0.02 | 0.51 | 99 | 8 | 0 | 53 | 2 | 0 |
| Ex. 3 | ○ | ○ | 0.01 | 0.53 | 112 | 13 | 0 | 62 | 4 | 0 |
| Ex. 4 | ○ | ○ | 0.03 | 0.51 | 114 | 13 | 0 | 55 | 3 | 0 |
| Ex. 5 | ○ | ○ | 0.02 | 0.52 | 106 | 14 | 1 | 51 | 4 | 0 |
| Ex. 6 | ○ | Δ | 0.04 | 0.5 | 123 | 16 | 1 | 62 | 8 | 0 |
| Ex. 7 | ○ | Δ | 0.04 | 0.49 | 122 | 18 | 0 | 66 | 7 | 0 |
| Ex. 8 | ○ | ○ | 0.005 | 0.53 | 98 | 9 | 0 | 55 | 8 | 0 |
| Ex. 9 | ○ | ○ | 0.008 | 0.52 | 87 | 5 | 0 | 44 | 2 | 0 |
| Ex. 10 | ○ | ○ | 0.004 | 0.52 | 82 | 6 | 0 | 42 | 1 | 0 |
| Ex. 11 | ○ | ○ | 0.008 | 0.53 | 79 | 5 | 0 | 41 | 1 | 0 |
| Ex. 12 | ○ | ○ | 0.03 | 0.54 | 131 | 18 | 1 | 56 | 11 | 1 |
| Ex. 13 | ○ | ○ | 0.01 | 0.54 | 72 | 5 | 0 | 38 | 1 | 0 |
| Ex. 14 | ○ | ○ | 0.02 | 0.55 | 68 | 4 | 0 | 32 | 1 | 0 |
| Com. Ex. 1 | X | X | 0.42 | 0.47 | 220 | 28 | 3 | 82 | 12 | 2 |

What is claimed is:

1. A dispersing agent comprising a polyvinyl alcohol resin containing carbonyl groups in its molecule and having a block character of remaining fatty acid ester groups of at least 0.5 and an absorbance of at least 0.1 measured at each of wavelengths of 215 nm, 280 mn and 320 nm with respect to a 0.1% by weight aqueous solution of the polyvinyl alcohol resin, wherein the ratio of absorbance at 320 nm to absorbance at 280 nm is at least 0.3.

2. The dispersing agent of claim 1, wherein each of the absorbances at wavelengths of 215 nm, 280 mn and 320 nm is at least 0.2.

3. The dispersing agent of claim 1, which contains at least one member selected from the group consisting of salts of a metal having a valence of 1 to 3 and hydroxides of a metal having a valence of 1 to 3.

4. The dispersing agent of claim 3, wherein said metal having a valence of 1 to 3 is at least one member selected from the group consisting of sodium, magnesium, calcium, zinc and aluminum.

5. The dispersing agent of claim 3, wherein said salts of a metal having a valence of 1 to 3 is a metal salt of an aliphatic carboxylic acid having 1 to 3 carbon atoms.

6. The dispersing agent of claim 1, which is prepared by feeding a polyvinyl alcohol resin to an extruder, and melt-extruding said resin at a resin temperature of 175 to 250° C.

7. A process for preparing a dispersing agent according to claim 1 for suspension polymerization of vinyl monomers comprising the steps of feeding a polyvinyl alcohol resin containing carbonyl groups and having a degree of hydrolysis of 65 to 98% by mole to an extruder, and melt-kneading therein said resin at a resin temperature of 175 to 250° C.

8. The process of claim 7, wherein said polyvinyl alcohol resin contains at least one member selected from the group consisting of salts of a metal having a valence of 1 to 3 and hydroxides of a metal having a valence of 1 to 3.

9. The process of claim 7, wherein said melt-kneading is carried out for 1 to 15 minutes.

10. The process of claim 7, wherein said polyvinyl alcohol resin is a partially hydrolyzed polyvinyl acetate having a degree of hydrolysis of 65 to 82% by mole or a partially hydrolyzed copolymer of vinyl acetate and other monomer copolymerizable therewith having a degree of hydrolysis of 65 to 82% by mole.

11. The dispersing agent of claim 1, wherein the ratio of absorbance at 320 nm to absorbance at 280 nm is from 0.45 to 1.5.

* * * * *

UNITED STATES PATENT AND TRADEMARK OFFICE
CERTIFICATE OF CORRECTION

PATENT NO. : 7,193,012 B2 Page 1 of 1
APPLICATION NO. : 10/769039
DATED : March 20, 2007
INVENTOR(S) : Mitsuo Shibutani

It is certified that error appears in the above-identified patent and that said Letters Patent is hereby corrected as shown below:

In column 17, line 30, claim 1, line 5 "mn" should be --nm--.

In column 17, line 34, claim 2, line 2 "mn" should be --nm--.

Signed and Sealed this

Tenth Day of July, 2007

JON W. DUDAS
*Director of the United States Patent and Trademark Office*